April 12, 1955   J. W. HOCK ET AL   2,705,889
RESONANT BEAM TESTING MACHINE
Filed May 9, 1952   2 Sheets-Sheet 1

INVENTORS:
JAMES W. HOCK
BRUCE R. VERNIER
THEIR PATENT ATTORNEY

April 12, 1955  J. W. HOCK ET AL  2,705,889
RESONANT BEAM TESTING MACHINE
Filed May 9, 1952  2 Sheets-Sheet 2

INVENTORS:
JAMES W. HOCK
BRUCE R. VERNIER
By Herbert E. Metcalf
THEIR PATENT ATTORNEY

United States Patent Office 2,705,889
Patented Apr. 12, 1955

2,705,889

RESONANT BEAM TESTING MACHINE

James W. Hock, Glendale, and Bruce R. Vernier, Hawthorne, Calif., assignors to Northrop Aircraft, Inc., Hawthorne, Calif., a corporation of California Application May 9, 1952, Serial No. 286,954

7 Claims. (Cl. 73—67)

The present invention relates to vibration testing apparatus, and more particularly to a "free free" resonant beam arrangement for this purpose; it will be understood that the apparatus is used to subject test pieces to vibration for the purpose of examining the effect of vibration thereon.

The term "free free" beam indicates a beam that is free from restraint in the plane of vibration. Such a beam having uniform characteristics throughout its length will vibrate at its resonant frequency in the well known manner of a violin string or piano wire, that is with maximum amplitude of movement between nodes at which there will be substantially no movement.

Among the objects of the present invention are:

To provide and efficient vibratory system capable of testing the effects of vibration on specific apparatus;

To provide a resonant beam vibration tester;

To provide a vibration testing device capable of efficient operation at low frequencies;

To provide a tunable vibration tester;

To provide a novel means for isolating the vibrations of a vibrating system from a support for said system, and To provide a vibratory test system wherein the time length of vibration exposure of the test piece can be accurately regulated.

Briefly, the present invention includes a frame supporting an elongated horizontal beam by suspension thereof at spaced points. A vibration generator is mounted at the center of the beam and energized to provide the desired vibration frequency. The suspension points on the beam are placed at nodal points so that no significant vibration is transmitted into the supporting frame. The apparatus to be tested is attached midway between the suspension points, and means are preferably provided to tune the vibration of the beam. In order that the time period during which the apparatus is subjected to vibration be closely controlled, a quick acting brake is preferably provided between the frame and beam at the center of the latter.

Other objects and advantages of the invention will appear from the ensuing description of the drawings, in which:

Figure 4 is a view partly in section and partly in elevation of braking means used in the device of Figure 1.

Figure 1:
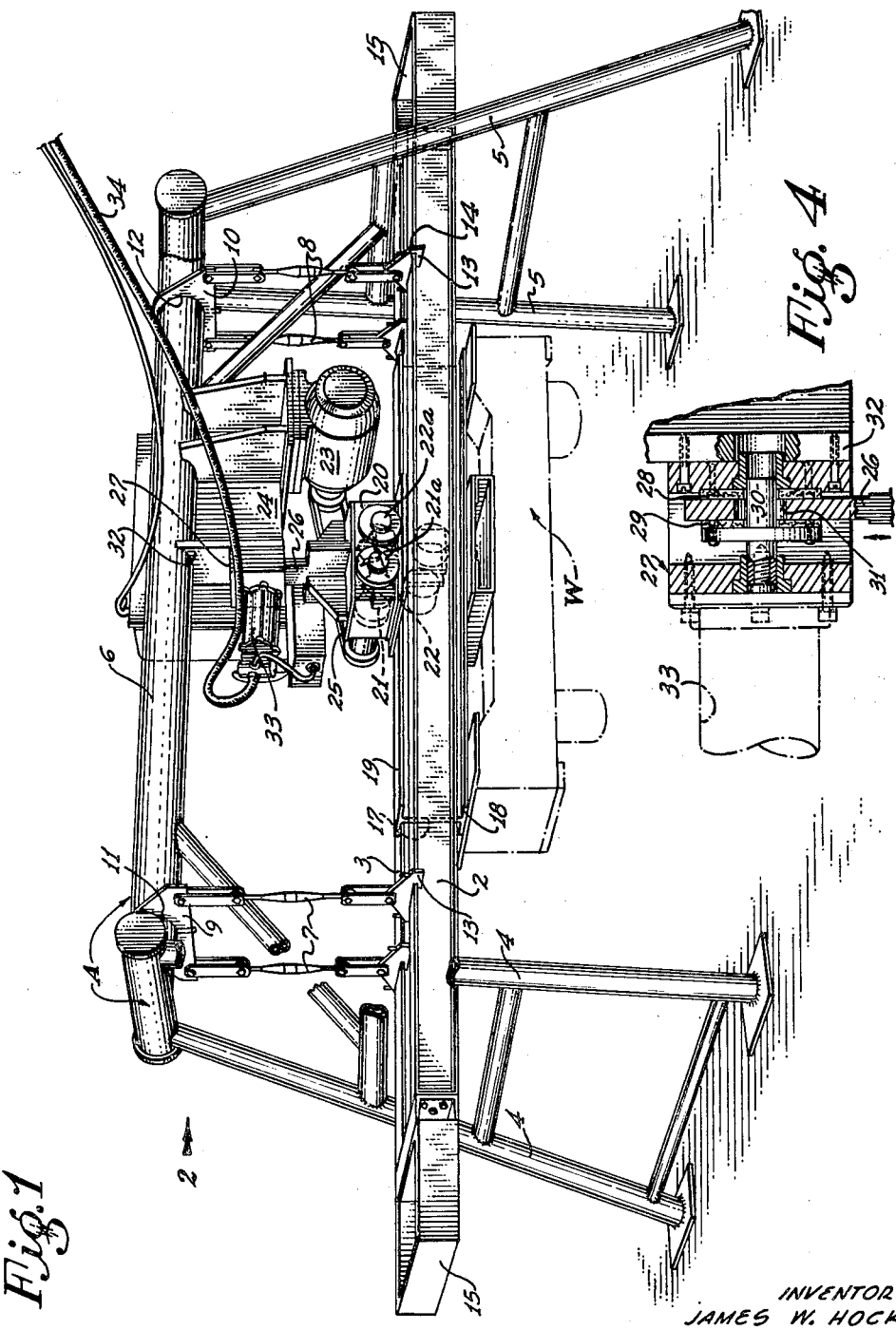
Figure 1 is a perspective view of one preferred form of the present invention.

Referring first to Figure 1, an elongated four-legged frame A supports two parallel I beams 2 and 3 extending longitudinally between, and free of the legs 4 and 5 of the frame A, the suspension of the I beams being made from a top tube 6 joining the end legs of the frame.

The suspension of the I beams consists of two pairs of links, 7, 8, of rigid material but adjustable as to length and comprising a number of connected elements, one pair at each end of tube 6, and at or near the vibration nodes of the I beams 2 and 3.

Each pair of links 7 and 8 is attached by the top thereof to the frame, with one link being secured to one side and the other to the other side of generally triangular suspension plates 9 and 10 respectively, each plate having a central hole 11, 12 through which tube 6 passes. The holes 11 and 12 are slightly larger than tube 6 so that the plates can slide longitudinally on the tube.

The I beam ends of the links are attached each to a generally triangular I beam plate 13 having lateral slots 14 therein to permit lateral extensions of the I beam plates to fit under the top flanges of the I beams. The slots are made to have a loose fit on the I beam, so that each I beam plate can also be moved longitudinally along the I beams 2 and 3. The beam structure so supported affords a "free free" beam.

The adjacent outer ends of the I beams, on the outside of the frame legs are joined by a weight box 15 so that the two I beams form a narrow box-like structure in which the horizontal moment of inertia, or stiffness, is much greater than the vertical moment of inertia.

Figure 2:
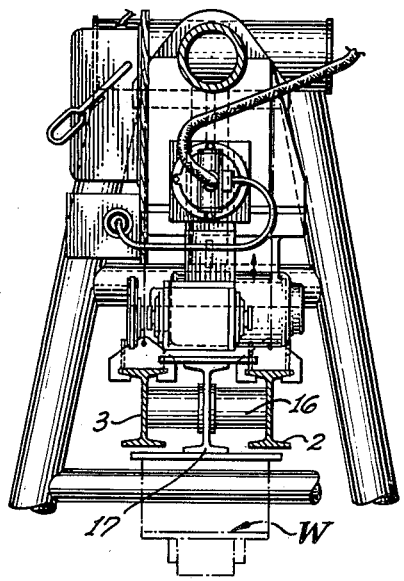
Figure 2 is a view partly in elevation and partly in section, taken as indicated by arrows 2 in Figure 3.
Figure 3:
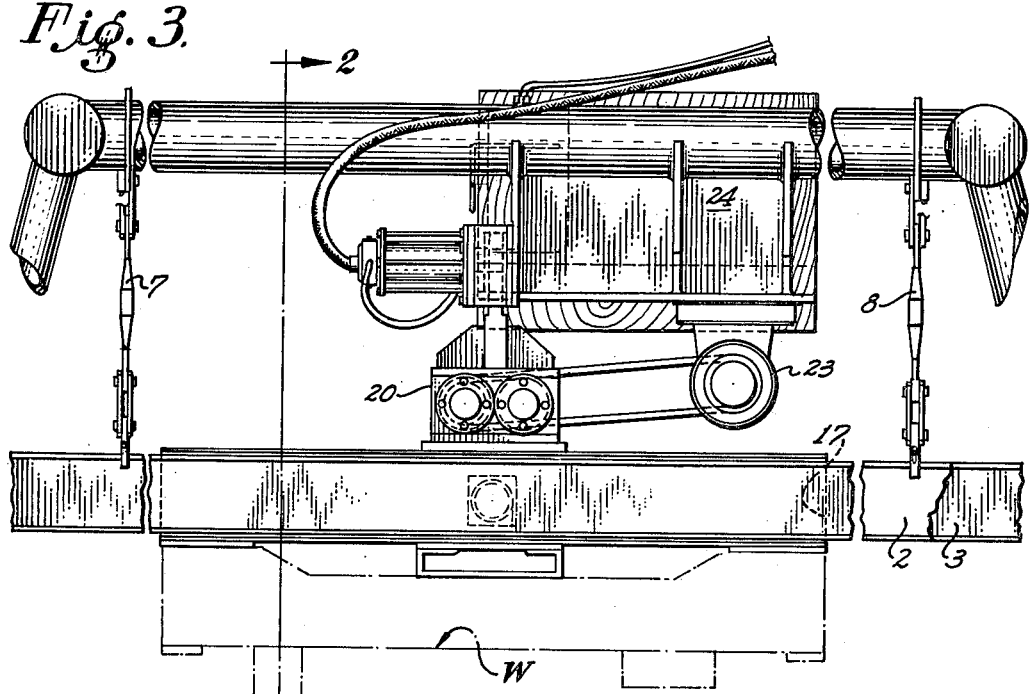
Figure 3 is an enlarged side view of the center portion of the device of Figure 1.

In addition, the two I beams 2 and 3 are joined centrally by a cross tube 16 as best shown in Figure 2 and a short third I beam, or test piece support beam 17, is centrally attached to the cross tube 16, this support beam extending longitudinally between the I beams 2 and 3. The article to be subjected to vibration is attached to the bottom web 18 of the support beam 17 as indicated generally by broken lines W in Figures 1, 2, and 3. To facilitate this mounting, support beam 17 has a slightly greater vertical height than beams 2 and 3, and therefore projects both above and below the level of I beams 2 and 3.

Figure 5:
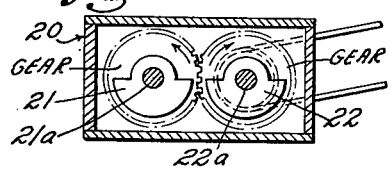
Figure 5 is a fragmentary detail cross section showing the conventional arrangement of eccentric weights identically arranged on shafts geared together to rotate at the same speed but in opposite directions to produce oscillation in a vertical plane only.

On the top flange 19 of support beam 17 is mounted a vibration box 20 containing eccentric weights 21, 22 of identical weight mounted identically on shafts 21a, 22a rotated at the same speed but in opposite directions (see Figure 5). The shafts 21a, 22a are rotated by a motor 23 mounted on a motor frame 24 attached solidly to top tube 6 at one side of vibration box 20. The motor rotates weights 21, 22 through a belt 25. Weights 21, 22 are arranged to generate vibration only in a vertical direction, since they rotate in opposite directions, all horizontal components of vibration being cancelled out.

Projecting upwardly from the top of vibration box 20 is a brake blade 26 in a plane directly above the axis of cross tube 16, this blade entering a brake box 27 mounted on motor frame 24.

As best shown in Figure 4, brake box 27 contains a fixed brake block 28 closely positioned adjacent the motor side of brake blade 26, and a movable brake block 29, positioned closely adjacent the opposite side of brake blade 26 opposite fixed brake block 28. Movable brake block 29 is mounted on a brake rod 30 extending at right angles to the two brake blocks and the intermediate brake blade, this brake rod passing through brake blade 26 in a vertically elongated hole 31 and then, through stationary brake block 28 to terminate in a support beam 32 attached to motor frame 24. Rod 30 can be moved longitudinally to clamp the brake blade 26 between brake blocks 28 and 29 by any convenient power means, in this case, as best shown in Figure 1, by a pneumatic actuator 33, supplied with air under pressure from line 34 under electric control.

In operation, the article to be vibration tested is mounted solely on support beam 17 with the weight of the article substantially evenly divided on each side of the axis of cross tube 16, and evenly divided between the beams 2 and 3.

The frequency of vibration being chosen, the pairs of links 7 and 8 are moved to place the beam plates 13 on nodes of the I beam frame, and suspension plates 9 and 10 are also moved to make the links stand substantially vertically over beam plates 13.

It is to be noted that the support 17 for the test piece is formed as a beam to enable elongated test pieces to be secured thereto if necessary at a plurality of points in their length, the weight of which is transmitted to the center of the beams 2 and 3 which are thus free to vibrate between their nodal points in the manner of a bow string.

If it is desired to change the character of the vibration the eccentric weights 21, 22 may be changed, or their speed of rotation, or both, and the loading of the beam may be adjusted by manipulation of the weights added to the weight boxes to obtain a required vertical amplitude of vibration. Any given beam system can have nodal points and box weights charted beforehand for various frequencies and article weights so that frequencies can be changed rapidly if desired.

With the suspension links attached to nodal points on I beams 2 and 3, and with the brake released no vibrations will be transmitted to the frame formed by the beams during the vibration tests.

The braking system shown will damp out the vibrations of the test piece very rapidly when operated so that exact time periods of vibration can be obtained by a timer for example which will start motor 23 and after a predetermined time will de-energize the motor and apply pneumatic braking force to actuator 33. Rapid cessation of vibration is also aided by using a motor of the well known type which is braked to a stop when de-energized.

The vibration tester as shown has proved highly successful in vibration testing vehicle components subject to heavy service vibration.

While in order to comply with the statute, the invention has been described in language more or less specific as to structural features, it is to be understood that the invention is not limited to the specific features shown, but that the means and contruction herein disclosed comprise a preferred form of putting the invention into effect, and the invention is therefore claimed in any of its forms or modifications within the legitimate and valid scope of the appended claims.

What is claimed is:

1. A vibration testing device including: a test piece supporting beam; an elongated supporting beam mounting part to which said supporting beam is connected at one point; a frame adapted to support said elongated member; adjustable means for connecting the elongated supporting beam mounting part at nodal points thereof to said frame, the test piece supporting beam being connected to the supporting beam mounting part intermediate the nodal points thereof; and vibration producing means operatively connected to said test piece supporting beam.

2. A vibration testing device including: a test piece supporting beam; an elongated beam mounting part to which said supporting beam is connected at the central point of said beam mounting part; a frame adapted to support said elongated part; adjustable means for connecting the elongated part at nodal points thereof to said frame; vertical vibration producing means operatively connected to said test piece supporting beam; and means attached to said beam mounting part by which said elongated beam mounting part may be loaded to control the characteristics of the vibration of said part.

3. A vibration device as set forth in claim 2 and in which said elongated beam mounting part comprises a rectangular frame in which the test piece supporting beam is mounted, and the means by which said beam mounting part may be loaded are formed as weight boxes positioned at the ends thereof by which loads may be placed on the elongated test beam mounting part.

4. A vibration testing device including: a horizontally arranged test piece supporting beam; an elongated supporting beam mounting part on which said supporting beam is positioned and to which it is connected at a central point of said beam mounting part; a supporting frame having a horizontal member extending over and in the vertical plane of said beam; parts adjustably engaging the horizontal member of the frame and the elongated beam mounting part at nodal points thereof; links connecting said adjustable parts; and vibration producing means operatively connected to said test piece supporting beam.

5. A vibration testing device including: a horizontally arranged test piece supporting beam; an elongated beam mounting part to which said beam is connected at a central point; a supporting frame having a horizontal member extending over and in the vertical plane of said beam; parts adjustably engaging the horizontal member of the frame and the elongated beam mounting part; links connecting said adjustable parts; an electric motor mounted on the horizontal member of the supporting frame; a member mounted on the test piece supporting beam and enclosing rotatable unbalanced weights; and flexible drive means transmitting rotation from said motor to the unbalanced weights.

6. A vibration testing device including: a horizontally arranged test piece supporting beam; an elongated beam mounting part to which said beam is connected at a central point; a supporting frame having a horizontal member extending over and in the vertical plane of said beam; parts adjustably engaging the horizontal member of the frame and the elongated beam mounting part at nodal points of the latter; links connecting said adjustable parts; vibration producing means operatively connected to said test piece supporting beam; and brake means for controlling the vibration imparted by said vibration producing means to said test piece supporting beam.

7. A vibration testing device including: a horizontally arranged test piece supporting beam; an elongated beam mounting part to which said beam is connected at a central point; a supporting frame having a horizontal member extending over and in the vertical plane of said beam; parts adjustably engaging the horizontal member of the frame and the elongated beam mounting part; links connecting said adjustable parts; vibration producing means operatively connected to said test piece supporting beam; a container enclosing said vibration producing means and mounted on said test piece supporting beam; a blade projecting vertically from and secured to said container; a brake box mounted on the supporting frame; a fixed brake block mounted in said brake box in position to engage against one surface of said blade; a movable brake block mounted in said brake box and guided for movement against the opposite side of said blade; and means for selectively moving said movable brake block against said blade to thereby effect braking of the vibratory movement of the test piece supporting beam effected by the vibration producing means.

References Cited in the file of this patent

UNITED STATES PATENTS

| | | |
|---|---|---|
| 1,161,234 | Lindsay | Nov. 23, 1915 |
| 2,238,116 | Kelly | Apr. 15, 1941 |
| 2,317,097 | Eksergian | Apr. 20, 1943 |
| 2,366,342 | Lazan | Jan. 2, 1945 |
| 2,553,391 | Tyler et al. | May 15, 1951 |